July 2, 1929.  J. C. SHAW ET AL  1,719,813
CAM CUTTING MACHINE
Original Filed Nov. 27, 1925   5 Sheets-Sheet 1

FIG. 1

INVENTOR.
John C. Shaw and
Robert D. Shaw
BY
H.H. Lockwood
ATTORNEYS.

FIG. 2

July 2, 1929.  J. C. SHAW ET AL  1,719,813
CAM CUTTING MACHINE
Original Filed Nov. 27, 1925    5 Sheets-Sheet 3

INVENTOR.
John C. Shaw and
Robert D. Shaw
BY
M. H. Lockwood
ATTORNEYS

Patented July 2, 1929.

1,719,813

UNITED STATES PATENT OFFICE.

JOHN C. SHAW AND ROBERT D. SHAW, OF BROOKLYN, NEW YORK, ASSIGNORS TO KELLER MECHANICAL ENGINEERING CORPORATION, OF BROOKLYN, NEW YORK, A CORPORATION OF NEW YORK.

CAM-CUTTING MACHINE.

Application filed November 27, 1925, Serial No. 71,826. Renewed June 5, 1928.

Our improvement relates more particularly to a means for cutting cams on an electrical tracer controlled machine tool, on the order of a milling machine or die sinking machine, equipped or operating somewhat after the manner of the machine shown and described in the patent to John C. Shaw, #1,506,454, August 26, 1924, or in the application of John C. Shaw, Ser. No. 696,827, filed March 4/24.

In machines of the type shown in the Shaw patent, three directions of feed motion are provided including horizontal, vertical and transverse and, ordinarily, the electric tracer is adapted for controlling only the in and out or toward and from feed of the transverse slide, although all of the feed motions are preferably controlled through magnetic clutch driven feed screws.

When a contouring tracer is used, as shown in said Shaw application, the tracer is adapted to control the horizontal and vertical feeds, that is, to control motion in two directions at right angles to each other.

In the present instance, however, the toward and from feed, under the control of the electric tracer, is applied to the horizontal slide or reciprocating table and, in cooperation therewith, a spindle carrying the cam blank is adapted to be rotated, in either direction, by means of magnetic clutches, electrically interconnected in such a manner as to be controlled through the action of the electric tracer. Operatively connected with the spindle carrying the cam blank, there is provided a template carrying member provided with a profile edge or contour, corresponding to the desired cam, said template being adapted to cooperate with the electric tracer to control the movements of the machine in such a manner as to produce the desired cam by the action of a cutter on the cam blank, as the tracer follows the edge of the template.

The main object of our improvement, therefore, is to provide a simple method of cutting cams, either of the face or edge type or drum cams by use of the same apparatus, when so desired.

This object may be carried out in a single purpose machine for cutting either face, edge or drum type of cams, but obviously, it will be understood that the mechanical features of our improvement may be adapted for or applied to standard types of milling or die sinking machines hereinbefore referred to.

A further object is to provide for cutting the desired cams from a template or pattern, preferably geared to the spindle carrying the cam blank and adapted for straight line movement in a radial direction, relative to the cam to be cut. Under these circumstances, the profile edge of the template, intended for cooperation with the electric tracer, represents a straight line development of the proposed cam and the gearing connection thereof with the cam blank spindle is such as to move the template a predetermined distance corresponding to 360° of movement of the spindle and hence of the cam blank carried thereby. In this manner, the proposed cam can be more readily laid out by laying out the points representing rises, dwells, etc., in a straight line, which is preferably accurately divided into spaces corresponding to the 360° of a circular cam.

In cutting a cam in this manner, a further object of our improvement is to provide for operating the magnetic clutches for the toward and from screw feed and for rotating the cam blank spindle on the main line high potential current, while controlling the energization of the respective magnetic clutches by means of relays in a low potential circuit controlled by tracer contacts on the tracer head. In this connection, also it will be understood that for mechanical reasons, it is not desirable to permit more than the 360° of movement of the template and, therefore, limit switches are provided for breaking the magnetic clutch circuits controlling the rotation of the cam blank spindle at each extreme of movement of the template or pattern.

One advantageous feature of our improvement for laying out and generating cams is that special template plates of standard length may be provided, the plates being preferably graduated or divided into spaces corresponding to 360°, lengthwise, and transversely thereof, into spaces representing linear measurements. Both sets of graduations may be formed by ruled lines, the sets being at right angles to each other in the manner of ordinary profile paper, thereby providing a simple and ready means for laying out a development of the desired cam. When these plates are properly laid out, the profile of the cam development may be readily cut out, so that when the plate is mounted in our improved machine, either a face plate or drum cam can be cut therefrom, as may be required. In this manner, the laying out and cutting of cams becomes a simple matter, for it eliminates the trouble ordinarily experienced in laying out cams in the ordinary manner, and, furthermore, it simplifies the reproduction of such cams if a plurality thereof should be desired.

In carrying out our improvement, we have preferred to illustrate a single purpose machine, which is shown in the accompanying drawings.

Figure 1:
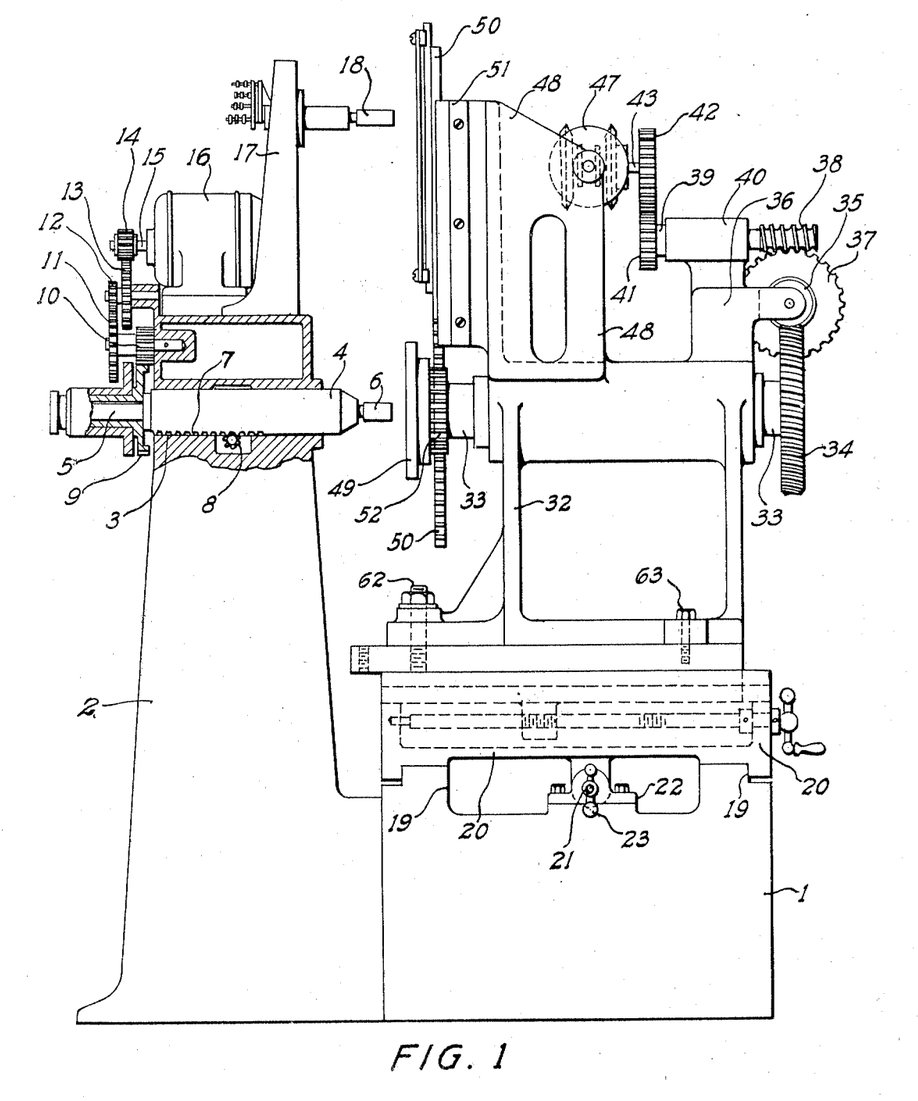
Fig. 1 shows an end elevation of our cam cutting machine, with a portion thereof in vertical section.

The form of cam cutting machine which we have illustrated comprises a base member 1, which may be cast integral with a pier 2 extending upward at one side of the base member and adapted to support the power driven cutter. For this purpose, the upper end of pier 2 is preferably provided with a transverse bore at 3, in which there is mounted a bearing thimble 4, carrying a spindle 5, in the outer end of which the cutter 6 may be secured. The bearing thimble 4 may preferably be provided with rack teeth at 7, meshing with a pinion 8 provided with a hand wheel in the usual manner, for moving the bearing thimble 4 and hence, adjusting the position of the cutter 6 in an axial direction. The spindle 5 carries a gear 9, which meshes with a pinion 10, secured to gear 11, which in turn, is driven by pinion 12 carried by gear 13, meshing with a pinion 14, mounted on the end of the shaft 15 of an electric motor 16, which is preferably mounted on the top of the pier 2, as shown in Fig. 1. It will be noted that the intermediate gearing 9 to 14 is adapted to reduce the speed of the cutter relative to the speed of the motor and, obviously the gears may be interchangeable so as to provide for any desired reduction or variation in the speed of the cutter that may be required.

Figure 2:
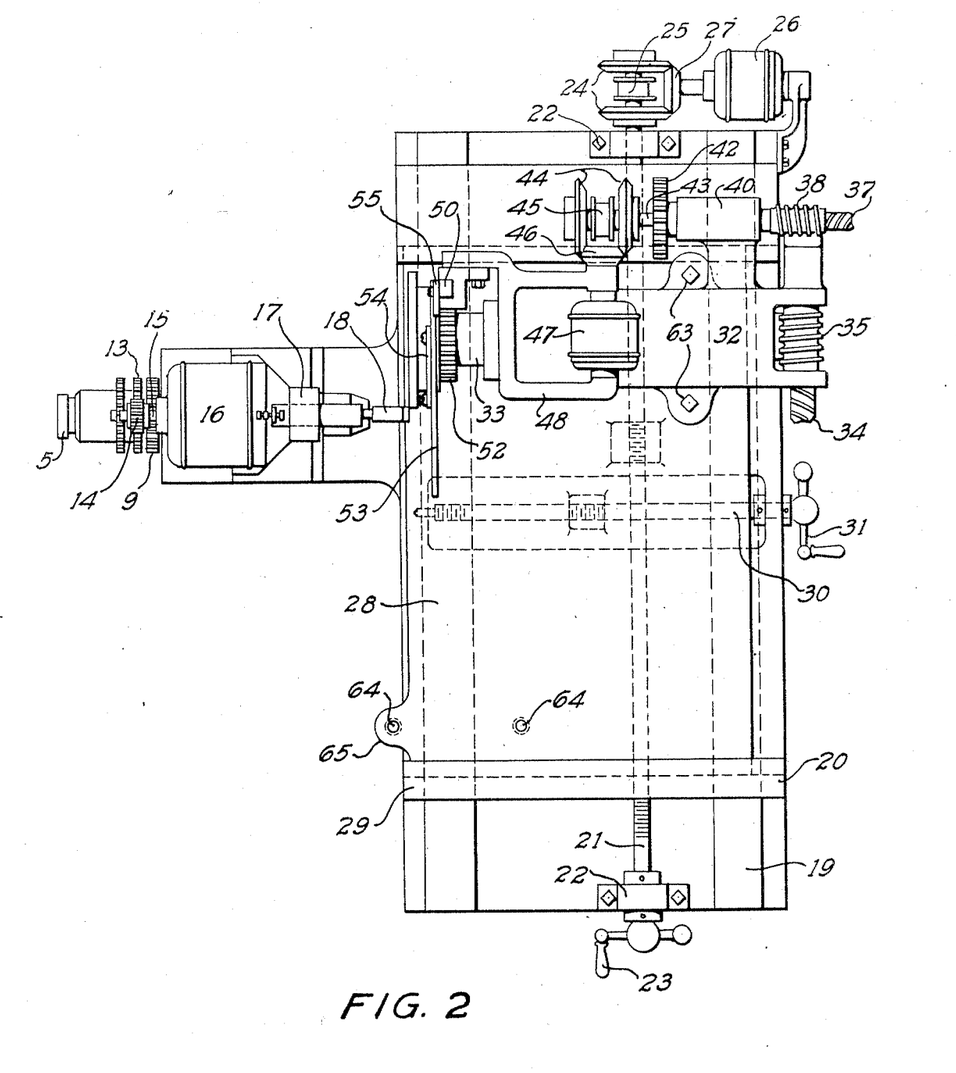
Fig. 2 is a top plan view of the machine as shown in Fig. 1.
Figures 3, 5:
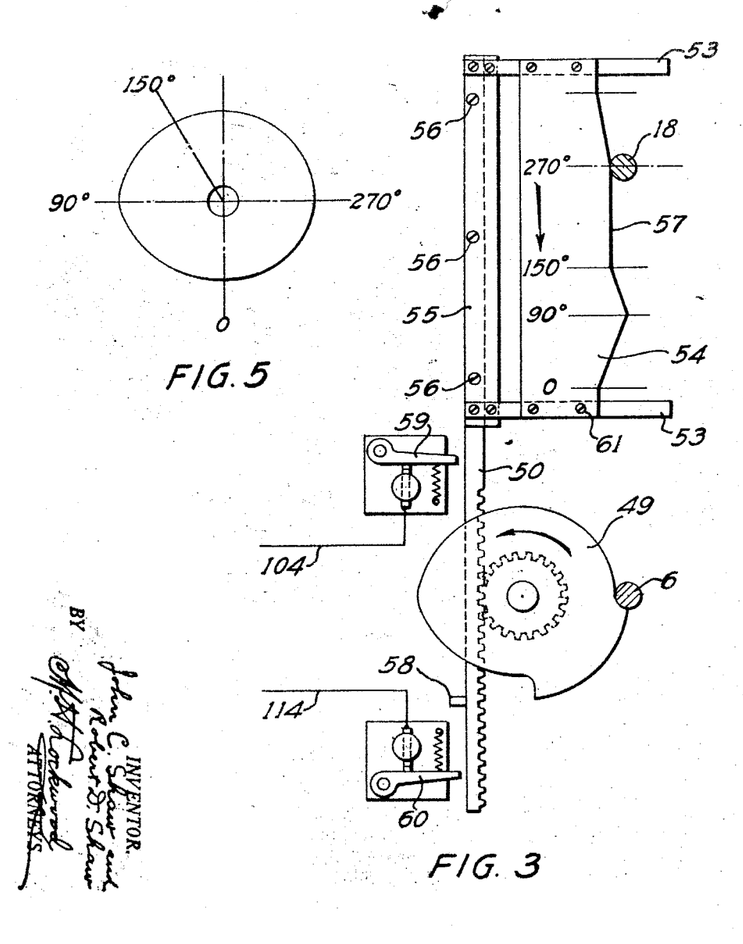
Fig. 3 is a broken away detail showing a front elevation of the template and cam blank during the operation of cutting a cam.
Fig. 5 represents an angular lay out of the cam being cut in Fig. 3, and represented by the contour or development on the template, shown in Fig. 3.
Figure 4:
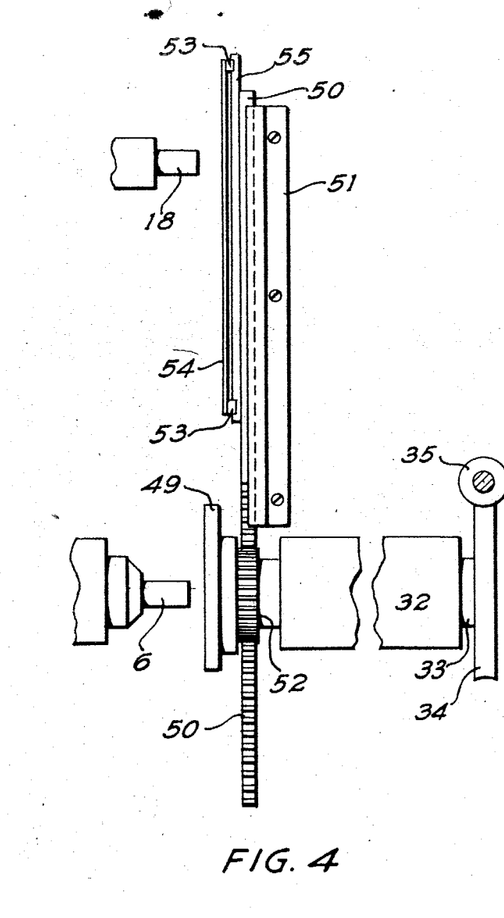
Fig. 4 is a side elevation of the parts shown in Fig. 3.

Mounted on the upper end of the pier 2, is a bracket 17, adapted to support an electric tracer 18, in a vertical plane, passing through the axis of the spindle 5 and cutter 6, substantially as indicated in Figs. 2 and 3 of the drawings. The electric tracer is adapted to cooperate with a template or pattern as hereinafter described, while the cutter is adapted to operate upon the cam blank to produce the desired cam as the tracer follows the edge of the template.

The upper portion of the base 1 is formed with slide ways 19, upon which there is mounted a longitudinal slide 20, which is adapted to be reciprocated or be fed longitudinally by means of a feed screw 21, which is mounted in bearings 22 on the bed 1, substantially as shown in Fig. 2. The usual hand wheel 23 may be provided at one end of the feed screw 21 for manual adjustment of the screw and preferably the opposite end is operatively connected with a pair of magnetic clutches 24, through the medium of the clutch armature 25, which is keyed to the shaft end of the screw 22, substantially as shown and described in the Shaw patent and application, hereinbefore referred to. The magnetic clutches 24 are adapted to be driven from the motor 26 by engaging the bevel pinion 27, thereby providing for toward and from feed of the carriage or slide 20, according to which of the clutches 24 is energized.

The slide 20 preferably carries a horizontal table 28, mounted on transverse ways 29, for sliding movement toward and from the pier 2, as indicated in Figs. 1 and 2, and a feed screw 30 is provided for adjusting the position of the table 28 relative to the tracer and cutter. The usual hand wheel 31 is provided for rotating the screw 30. Mounted upon the transverse slide or table 28 is a bracket support 32, carrying and rotatably supporting a spindle 33, the axis of which is adapted to lie in the same horizontal plane with the axis of the spindle 5 and cutter 6 and, as shown in Figs. 1 and 2, the spindle 33 lies nearly end to end parallel with the spindle 5. The outer or right end of the spindle 33, as seen in Figs. 1 and 2, preferably carries a worm gear 34, with which a worm 35 meshes, the latter being rotatably mounted in a bearing block 36, preferably cast integral with the upper end of the bracket support 32, as indicated in Fig. 1. The shaft of worm 35 preferably carries at one end a worm gear 37 meshing with another worm 38, carried on the end of a shaft 39, rotatably mounted in a bearing block 40, also formed, in the present instance, as an integral part of the bearing support 36. The opposite end of the shaft 39 carries a gear 41, which meshes with a gear 42 mounted on the end of a shaft 43, operatively connected to a pair of magnetic clutches 44 through the clutch armature 45 substantially as shown and described in the Shaw patent and application previously referred to. The magnetic clutches 44 are adapted to be driven by a pinion 46, secured to the driving shaft of a motor 47, in the present instance mounted in a bracket 48, secured to and extending upward above the bearing for the spindle 33, in the bracket support 32, as shown in Fig. 1. By this arrangement of intermediate worm gear drive mechanism, it will be understood that the spindle 33 may be rotated at reduced speed, as compared with the motor 47, the direction of rotation being controlled by energizing one or the other of the magnetic clutches 44. The length of time the magnetic clutches are energized determines the amount of rotation of the spindle 33 and this, as hereinafter described, is adapted to be controlled by the electric tracer 18.

The end of the spindle 33, facing the cutter 6, as shown in Fig. 1, is adapted to support the cam blank 49, which is secured thereto and adapted to be rotated by the magnetic clutches 44 through the intermediate worm gearing just described. It will be understood that by means of the transverse slide or table 28, upon which the supporting bracket 32 is mounted, the position of the cam blank 49, relative to the cutter 6, can be adjusted so that the latter may cut the proposed cam, either on the face of the blank or around the edge thereof, as more particularly described hereinafter.

In order to completely control the cutting of the desired cam by automatic control of the feeds through the tracer 18, a rack 50 is preferably mounted to slide vertically in slide ways 51, mounted on the bracket 48, as indicated in Fig. 1. The rack 50 meshes with a gear 52 mounted on the spindle 33, directly back of the cam blank 49, as shown in Fig. 1. The upper end of the rack 50 is preferably provided with laterally extending supporting arms 53, for supporting a template 54, as indicated in Fig. 3, the arms 53 being preferably secured to the ends of a plate or bar 55, secured by screws 56 to the upper part of the rack bar 50.

The profile edge 57 of the template 54 is adapted to be cut to correspond with a development of the proposed cam and this edge is adapted to cooperate with the tracer 18 to control the relative toward and from movement between the cutter 6 and the cam blank 49, to thereby produce or cut the desired cam as the cam blank is rotated by means of the magnetic clutches 44. Obviously, in cutting cams according to our method, the longitudinal movement of the rack 50 should correspond to 360° of circular movement of the cam blank 49. Hence, to prevent excessive movement in either direction, a dog or stud 58 is preferably attached to the rack bar 50, and is adapted to engage upper and lower limit switches 59 and 60, for breaking the circuits of the respective magnetic clutches 44, at either extreme of movement of the rack bar 50, to thereby stop rotative movement of the cam blank 49.

Standard plates may preferably be supplied from which the templates 54 may be cut. Such plates are preferably graduated longitudinally or marked off to represent 360° of movement, corresponding to a complete rotation of the pinion 52 and spindle 33, and hence, to a complete rotation of the cam blank 49. These template plates may preferably be supplied in standard lengths and widths graduated longitudinally by cross lines, corresponding to degrees, and transversely by lines corresponding to linear measurements in inches or in the metric system, for accurately laying out the distance of the points, rises and dwells, from the base line or center of the proposed circular cam. After the development of the proposed cam has been laid out on the ruled plate, just described, the profile edge 57 thereof may be cut to represent a straight line development of the cam, this edge being adapted for cooperation with the tracer 18, as indicated in Fig. 3.

The templates 54 are preferably adapted to be removably secured to the bracket arms 53, by suitable screws 61, thereby providing a ready means for substituting one template for another, when it is desired to cut a different form of cam. In Fig. 3, the position of the respective parts represents the operation of cutting an edge cam which when finished, will correspond substantially to the cam represented in Fig. 5; the latter being laid out in the usual manner. From a comparison of the ordinary method of laying out a cam, as shown in Fig. 5, with the simple method of laying out a straight line development thereof, as represented by the profile edge 57, in Fig. 3, it will be readily understood that our improvement provides an exceedingly simple means, whereby the ordinary machinist in the shop can lay out the desired cam, without any particular trouble, thus eliminating all of the bother and elaborate calculations that are ordinarily required for accurately laying out a cam, as indicated in Fig. 5.

The supporting bracket 32, carrying the cam blank spindle 33, is adapted to be secured to the transverse slide or reciprocating table 28, by a swivel bolt 62, and two lag bolts 63, as indicated in Figs. 1 and 2, so that the spindle lies transveresly of the reciprocating feed movement imparted thereto by the feed screw 21, under the control of the magnetic clutches 24. When the spindle support is secured to the reciprocating table 28 in this manner, that is, as shown in Figs. 1 and 2, the machine is adapted for cutting face or edge cams on face plate type of cam blanks 49, which are adapted for cooperation with the cutter 6, while the tracer 18 is in cooperation with the edge 57 of the template 54, as indicated in Fig. 3 of the drawings.

Figure 6:
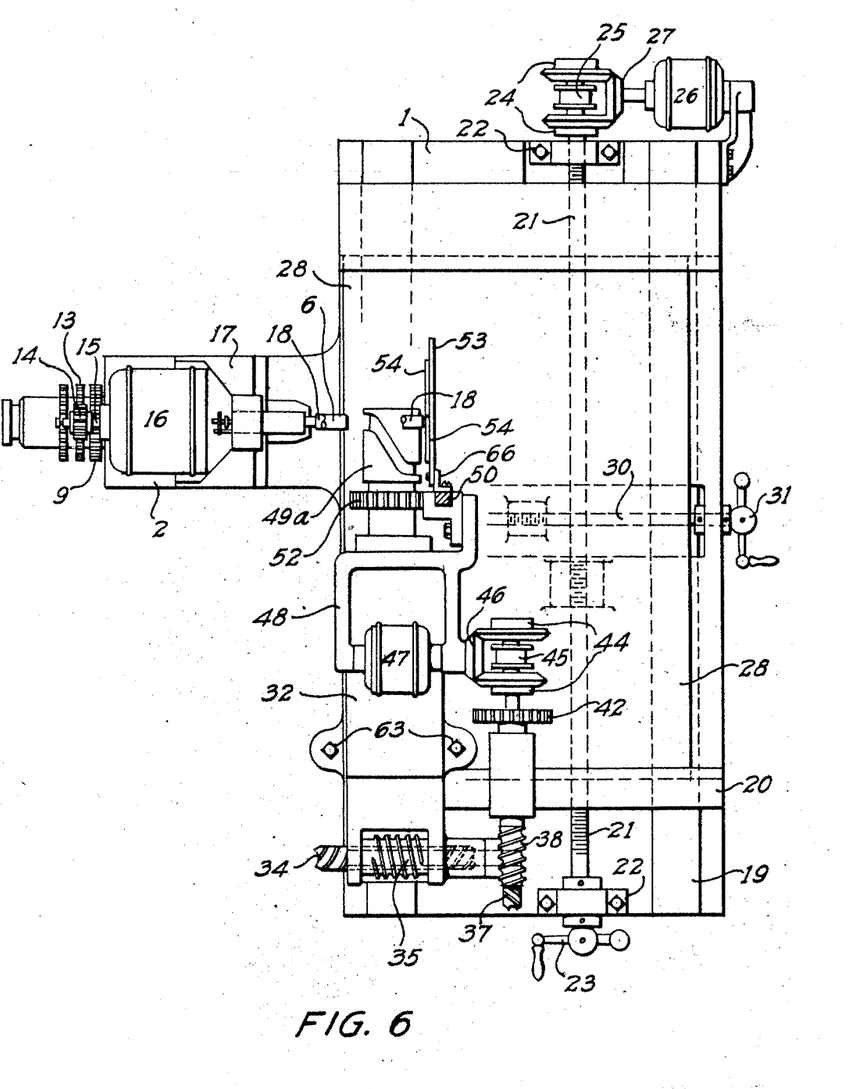
Fig. 6 is a top plan view of the cam cutting machine of Figs. 1 and 2, in which the cam blank spindle and associated parts are shown as rotated 90° for the purpose of cutting a drum cam.

It is obviously desirable, however, to utilize the same machine for cutting drum cams when so desired, and for this purpose the supporting bracket 32 is mounted on the reciprocating table 28 so that it may be swung around the swivel bolt 62, when the lag bolts 63 are removed, and may be again secured to the table top 28, with the spindle 33 at right angles to the spindle 5, or parallel to the feed screw 21, as indicated in Fig. 6. For securing the spindle supporting bracket 32 in position for cutting drum cams, the table 28 is provided with suitably located threaded screw holes 64, as shown in Fig. 2, adapted to receive the lag bolts 63, and thereby secure the support 32 in the position shown in Fig. 6. The left screw hole 64 is preferably located in an ear 65 projecting from the side of the table 28, as shown in Figs. 1 and 2.

By the arrangement just described, it will be seen that a drum cam blank may be mounted on the end of the spindle 33 and brought into cooperative relation with the cutter 6, so that the latter may operate on the blank to cut the desired cam, it being understood that the cutter should be of a diameter corresponding to the diameter of the cam roller. In cutting drum cams, it is obvious that the same toward and from movement of the reciprocating table 28, under the action of the magnetic clutches 24, driving the feed screw 21, is required and may be controlled by the tracer 18, following the profile development of the cam on the template 54.

For cutting a cam, however, the template 54 should be disposed in a vertical plane at right angles to the axis of the tracer (the same as with an edge cam) and in order to do this, after the spindle supporting bracket 32 has been moved around 90°, to the position shown in Fig. 6, an angle bar 66 is preferably substituted for the bar 55 and secured to the upper part of the rack bar 59, by the screws 56, said angle bar 66 being provided with corresponding arms 53, for supporting the template, substantially as shown in Fig. 6. In using the same cam blank rotating mechanism for cutting drum cams, as well as for face and edge cams, it will be understood that the same electrical control mechanisms are brought into play under the control of the electric tracer, and the only change required in the machine is shifting the cam blank spindle 33, 90° and then shifting the template so as to maintain it at right angles to the tracer.

Figure 7:
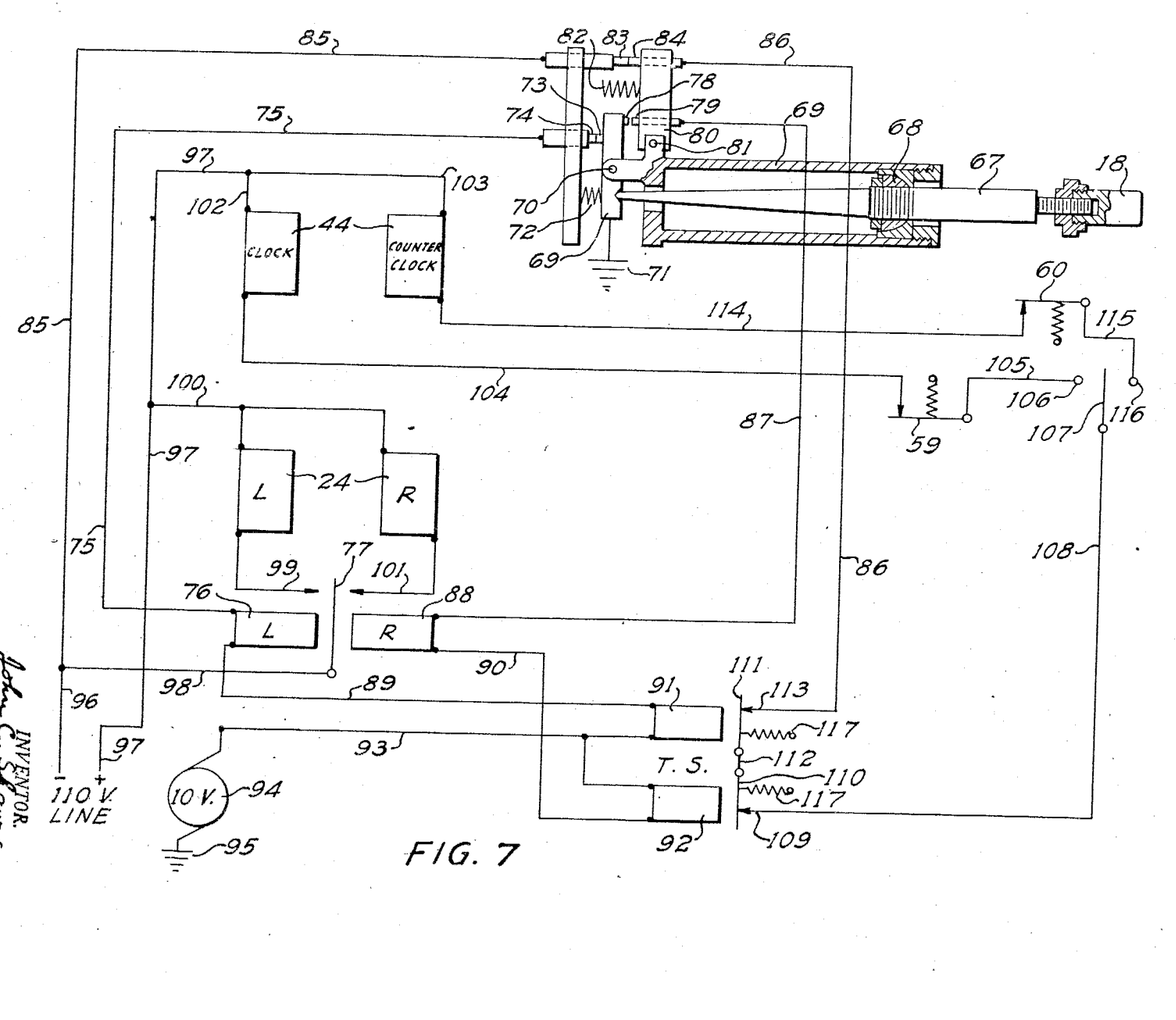
Fig. 7 illustrates the tracer diagrammatically, in connection with a wiring diagram of the electrical connections, whereby the control of the machine is effected.

The control of our improved cam cutting machine by means of the tracer, will be more clearly understood by reference to the wiring diagram shown in Fig. 7. In connection with the wiring diagram, the electric tracer is shown diagrammatically and partially in section, the tracer preferred, corresponding to the electric tracer shown and described in the Shaw application, hereinbefore referred to. It will be seen that the tracer 18 is carried on the end of a universally movable pivoted bar 67, adapted to wobble on a ball and socket joint at 68, supported in a tubular casing 69, which is adapted to be supported in the bracket 17, as indicated in Figs. 1 and 2. The inner end of the tracer bar 67 is seated in a cone socket in the lower end of the contact lever 69, which is pivoted at 70 in the head of the tracer, through which it is grounded to the machine, as indicated at 71. A spring 72 is adapted to keep the lower end of the contact lever seated on the end of the tracer bar 67, and move the upper end of the contact lever so as to normally close contact 73 with contact 74, which, by means of the lead 75, is connected to the magnet 76 of a double throw relay, the armature contact bar 77 of which is adapted to close a high potential circuit to the magnetic clutches 24, for operating the toward and from feed of the table 28, as hereinbefore described.

The upper end of the contact carrying lever 69 also carries a contact 78, adapted to cooperate with a contact 79, carried in an auxiliary contact lever 80, pivoted at 81, in the tracer head, as indicated in Fig. 7. The contacts 78 and 79 are normally open for, as previously stated, normally the contacts 73 and 74 are closed. A spring 82 is provided for holding the auxiliary contact bar 80, with contacts 83 and 84 closed, these last mentioned contacts being adapted to close the main line high potential, or 110 volt circuit, through the leads 85 and 86 connected to the respective contacts as shown in Fig. 7. The contact 79 is connected by lead 87 with the magnet 88 of the double throw relay and is adapted to operate on the same contact carrying armature 77.

The circuits of the relay magnets 76 and 88, marked respectively L and R in Fig. 7, are completed through leads 89 and 90, connected respectively to relay magnets 91 and 92, the circuits of the latter magnets being completed through the lead 93 to the source of low potential current at 94, which is represented as grounded at 95 to complete the circuit through the machine. It will thus be seen that for normal operation of the tracer, the contacts controlled thereby are on a low potential circuit, such that the contacts will not be injured, while relays are provided for control of the high potential circuits, utilized for energizing the magnetic clutches 24 and 44.

The 110 volt or high potential source is indicated by the leads at 96 and 97, the former being connected by the lead 85 to the contact 83 and also by lead 98 with the pivot of the double throw relay armature 77, so as to complete the circuit through lead 99 to the magnetic clutch 24, (marked L) for controlling feed of the table 28 and, hence, of the cam blank carried on the spindle 33, to the left, or toward the cutter as viewed in Fig. 2. The circuit from the left (L) magnetic clutch 24 is completed through lead 100, which is connected with the main line lead 97, as will be seen in Fig. 7. The right feed magnetic clutch 24 (marked R in Fig. 7) is connected by lead 101 with a contact adapted to be closed by the double throw armature 77, when the relay magnet 88 is energized. The circuit through the right feed magnetic clutch (R) is completed through the lead 100, same as the left feed magnetic clutch. Normally, as previously pointed out, the contacts 73 and 74 are closed, thus energizing the relay magnet 76 and closing the main line circuit through the armature 77 and lead 99 to the left feed magnetic clutch 24, but obviously, if the pressure becomes too great on the tracer 18, the contacts 73—74 will be separated and the circuit broken. Further excessive pressure on the tracer will close the contacts 78 and 79 to energize the relay magnet 88, which, by moving the armature 77 over to close the circuit through the lead 101, to the magnetic clutch 24, marked R, will energize the latter to thereby move the reciprocating table 28 toward the right, and, in so doing, will move the cam blank, as shown in Fig. 2, away from the cutter.

The high potential main line circuit (110 volts) is also utilized for energizing the magnetic clutches 44, for rotating the cam blank in one direction or the other. These clutches are indicated in the wiring diagram of Fig. 7, one being marked "clock" and the other "counter-clock" to designate the direction of rotation given to the cam blank mounted on the end of the spindle 33. The main line lead 97 is connected by short leads 102 and 103 with the respective magnetic clutches 44, and the circuit of the clockwise clutch is connected by lead 104 with the contact of the limit switch 59, and then by lead 105 with a terminal contact 106, with which a double throw switch 107 is adapted to cooperate, the latter being connected by lead 108 with a contact at 109, cooperating with an armature contact bar 110, adapted to be actuated by the table stop relay magnet 92, as indicated in Fig. 7. The table stop relay 91 also cooperates with a contact armature 111, which is connected by a short lead 112 with the armature 110, the high potential circuit being completed through armature contact 113 and lead 86, previously referred to. The lead 86, it will be seen, is connected with the contact 84 on the auxiliary lever 80 carried by the tracer head. Thus the contacts 83 and 84 serve as an emergency cut out or safety device, in that excessive pressure on the tracer 18, after closing contacts 78 and 79 and reversing the feed of the table 28, will break the circuit of the clutches 44 and stop the rotation of the cam blanks, if this has not already been accomplished by the breaking of contacts at 109 or 113. The counter-clock magnetic clutch 44 has its circuit completed through lead 114 to the rotation or rack limit switch represented by contact lever 60, which, through the lead 115, is connected with a terminal contact 116, adapted, like contact 106, to cooperate with the double throw switch 107 to determine the direction of rotation of the cam blank. It is obvious that in cutting any particular cam, the direction of rotation of the cam blank need not be changed during the cutting operation and, hence, after the switch 107 has been thrown to one contact or the other (106 or 116), the switch will remain closed on that contact until the cutting operation is completed. The respective limiting switches 59 and 60, however, will break the operating circuit at the extreme of movement, either up or down, of the rack bar 50, thus preventing injury to the machine and stopping the rotation of the cam blank at the completion of a single rotation. The table stop relay magnets 91 and 92 each operates a single throw contact armature and these armatures 110 and 111 are normally held by springs 117 to close the respective contacts 109 and 113, which is the circuit through the switch 107.

Our improved scheme for laying out and cutting cams and the operation of our improved cam cutting machine will be understood from the foregoing description, in connection with the drawings and the wiring diagram, but it is desirable to describe briefly the cutting of the two types of cams.

For cutting an edge cam, substantially as indicated in Figs. 3 and 5 of the drawings, the cam blank 49 comprises a face plate or cam disc mounted upon the end of the spindle 33, which should be located transversely of the reciprocating table 28, as illustrated in Figs. 1 and 2. The proposed cam is then laid out on a template plate 54, which, as previously pointed out, is preferably of standard predetermined length and graduated longitudinally to correspond to 360° of circumferential movement of the associated spindle 33, to which it is geared by the rack bar 50 and pinion 52. The rises, depressions and dwells of the desired cam are laid out in a straight line development on the template plate, and the edge of the latter is cut to represent the profile of the desired cam. The template edge 57 is mounted to cooperate with the tracer 18 for controlling the reciprocatory movement of the table 28 and, hence, the toward and from feed between the cam blank and template on the one hand and the cutter and the tracer on the other.

As illustrated by the wiring diagram Fig. 7, the tracer 18 controls the circuits of the magnetic clutches 24, through the double throw relay 76—77—88, so that relatively the cutter and cam blank are moved axially toward or from each other, corresponding identically with the angular positions of the rises, depressions and dwells of the template. The magnetic clutches 44 will rotate the cam blank 49 and spindle 33 in either clock-wise or counter-clockwise direction, according to which way the switch 107 is thrown, and the rotation of the spindle 33 (and longitudinal movement of the template) is adapted to be controlled through the table stop relays 91—92, and their contact armatures 110 and 111. In case of excessive pressure on the tracer 18, however, the high potential circuit through the magnetic clutches 44 will be broken at the contacts 83—84. As illustrated in Fig. 3, the cam blank 49 is being rotated counter-clockwise and the cutter is shown as nearly completing the cutting of an edge cam corresponding to that shown in Fig. 5. As previously pointed out, when the spindle 33 and cam blank 49 complete a rotation, the dog 58 on the rack bar 50 is adapted to engage the limit switch 60 and break the contact, thereby opening the circuit of the leads 114 and 115 to the counter-clockwise magnetic clutch 44, as will be seen from Fig. 7, of the drawings.

When it is desired to cut a face cam, the template is mounted in the same manner as shown in Fig. 3, and the same relation of the spindles 5 and 33, as shown in Figs. 1 and 2, is employed, the only difference being that in starting the cutting of the cam, the cutter which may be provided with an end mill, bores into the face of the cam blank the desired depth before rotary motion of the cam blank and spindle 33 is started. The depth of the mill into the face of the cam blank may be determined by rotation of the transverse feed screw 30. After the cutter has penetrated the face of the cam blank the desired depth, the cutting of the face cam is controlled by the tracer 18, following the edge 57 of the template 54, substantially as previously described for the edge cam shown in Fig. 3.

When it is desired to cut a barrel cam, the supporting member 32, carrying the cam spindle 33, is rotated 90° to the position shown in Fig. 6, and secured to the reciprocating table 28, by the lag screws 63. The barrel cam blank 49ª is then secured to the end of the spindle 33, substantially as shown in Fig. 6. A development of the desired cam is then laid out on one of the standard template plates, substantially in the same manner as previously described for edge and face cams. The distance of the points of the cam, in this case, should be measured from a base line, after which the profile edge of the template may be cut to correspond to the development of the proposed cam. The template, however, is mounted on the upper end of the rack bar 50, parallel with a vertical plane through the cam spindle 33, instead of at right angles thereto, the plane of the template, however, being at right angles to the tracer 18, with which the edge thereof is adapted to cooperate.

The operation of cutting a drum cam after the machine has been prepared as just described, and fitted with the desired template, is substantially the same as described for face or edge cams. That is, the toward and from movement of the reciprocating table 28, relative to the cutter, is controlled by the action of the profile edge of the template on the tracer 18, and the latter operating through the contacts 73—74 and 78—79, is adapted to control the feed of the table 28 through the double throw relay, which in turn controls the magnetic clutches 24. The automatic control of the rotation of the drum cam blank, for cutting the drum cam is the same as described in connection with cutting the edge and face cams.

Furthermore, while we have shown and described the preferred form of our improved cam cutting machine, it will be understood that we do not wish to be limited to the specific details of construction given, for various modifications and adaptations, may be made in the mechanical arrangement and the relation of parts, without departing from the spirit and scope of the invention.

We claim:—

1. A cam cutting machine comprising a rotatable cutter and an electric tracer, mounted in the same axial plane, a rotatable spindle carrying a cam blank for cooperation with said cutter, a profile template mounted for movement in a straight line radially of said spindle and adapted for cooperation with said tracer, means for rotating said spindle and simultaneously moving said template longitudinally past the tracer, and magnetic clutch operated screw feed means for causing relative movement between the tracer and cutter and the template and cam blank, under the control of said tracer.

2. The cam cutting machine as claimed in claim 1, in which said template is mounted on a rack bar meshing with a gear carried by said spindle, whereby the template is adapted for longitudinal movement corresponding with the rotary movement of the cam blank.

3. The cam cutting machine as claimed in claim 1, in which said cam blank spindle is adapted to be rotated by magnetic clutches and cut out switches are provided for limiting the longitudinal movement of said template in either direction by stopping the rotation of said spindle by the respective magnetic clutches.

4. The cam cutting machine as claimed in claim 1 in which said spindle for supporting and rotating the cam blank is mounted in a support carried by a reciprocating table and said spindle support is adapted to be mounted on said reciprocating table either with the spindle parallel to the axis of the cutter or at right angles thereto.

5. The cam cutting machine as claimed in claim 1, in which said rotating spindle and the associated template are mounted on a reciprocating table, adapted for movement by said magnetic clutch operated feed screw under the control of the electric tracer.

6. A machine tool organized for cutting cams comprising a rotatable cutter and an electric tracer, mounted in the same axial plane for cooperation respectively with a cam blank and a profile pattern of the desired cam, means for rotating said cam blank and simultaneously moving said pattern, magnetic clutch operated screw feed means for producing relative toward and from movement between the cam blank and the cutter and the pattern and the tracer, said to and from movements being controlled by the tracer in cooperation with said magnetic clutches as the tracer follows the pattern.

7. The machine tool as claimed in claim 6, in which said tracer for controlling said toward and from movement is provided with contacts, operating to make and break a low potential circuit through relays controlling a high potential circuit for operating said magnetic clutches.

8. The machine tool as claimed in claim 6, in which the means for rotating said cam blank comprises a magnetic clutch drive, the clutches of which are adapted to operate on the high potential main line circuit and relays adapted to be actuated by a low potential circuit controlled by said tracer are adapted to break the respective circuits of said clutches and stop rotation of the cam blank.

9. The machine tool as claimed in claim 6, in which motor driven magnetic clutches are provided for rotating said cam blank and simultaneously moving said profile pattern, said clutches being adapted to be energized by the high potential main line circuit, and limit switches placed in circuit with the respective magnetic clutches are adapted to be operated by dogs at the extremes of the pattern to thereby stop rotation of the cam blank after a complete rotation thereof in either direction.

10. The machine tool as claimed in claim 6, in which magnetic clutches are provided for rotating said cam blank and means is provided whereby said tracer acting through said last named clutches is adapted to control the rotation of said cam blank.

11. A machine tool organized for cutting cams, comprising a rotatable cutter and an electric tracer, mounted in parallel relation in the same vertical plane, a cam blank carrying spindle mounted for rotation in a horizontal plane passing through the axis of said cutter, a template, carrying a profile of the desired cam, adapted to be moved synchronously with the rotation of said spindle, the profile of said template being adapted to cooperate with said tracer, and means controlled by said tracer for producing relative movement between said cutter and the cam blank for cutting the cam as the tracer follows the profile.

12. The machine tool as claimed in claim 11, in which means is provided for operatively rotating said cam blank spindle, either parallel with or at right angles to the axis of said cutter for cutting respectively edge and face or barrel cams.

13. The machine tool as claimed in claim 11, in which a slidably mounted rack is geared to said spindle for moving said template, and means is provided for securing the template to said rack, either parallel with or at right angles to the axis of said spindle.

14. The machine tool as claimed in claim 11, in which said spindle is adapted to be rotated either parallel with or at right angles to the axis of said cutter for cutting respectively face and edge cams or barrel cams and a rack bar geared to said spindle is provided with means for holding said template in a vertical plane at right angles to said spindle in the first instance and parallel therewith in the second instance.

JOHN C. SHAW.
ROBERT D. SHAW.